US008626196B2

(12) United States Patent
Waters et al.

(10) Patent No.: US 8,626,196 B2
(45) Date of Patent: Jan. 7, 2014

(54) WIRELESS-BASED POSITIONING WITHOUT ASSOCIATION

(75) Inventors: Deric Wayne Waters, Dallas, TX (US); Ariton E. Xhafa, Plano, TX (US); Ramanuja Vedantham, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 79 days.

(21) Appl. No.: 13/462,322

(22) Filed: May 2, 2012

(65) Prior Publication Data

US 2012/0282948 A1 Nov. 8, 2012

Related U.S. Application Data

(60) Provisional application No. 61/482,054, filed on May 3, 2011.

(51) Int. Cl.
*H04W 24/00* (2009.01)

(52) U.S. Cl.
USPC ........... 455/456.2; 455/456.1; 455/404.2; 455/410; 455/411; 370/310

(58) Field of Classification Search
USPC ........ 455/410, 411, 456.1–456.6, 404.2, 574; 370/310
See application file for complete search history.

(56) References Cited

U.S. PATENT DOCUMENTS

| 2004/0203818 | A1* | 10/2004 | Cromer et al. | 455/452.1 |
| 2010/0284316 | A1* | 11/2010 | Sampathkumar | 370/311 |
| 2010/0296441 | A1* | 11/2010 | Barkan | 370/328 |
| 2012/0195193 | A1* | 8/2012 | Camps Mur et al. | 370/230 |

* cited by examiner

*Primary Examiner* — Wayne Cai
(74) *Attorney, Agent, or Firm* — Steven A. Shaw; Wade James Brady, III; Frederick J. Telecky, Jr.

(57) ABSTRACT

A wireless location assist device (WLAD) comprises control logic and a wireless radio coupled to the control logic. The control logic causes the radio to perform at least one of wireless local area network (WLAN) beacon transmission and WLAN probe request receipt and response. The control logic never permits the WLAD to associate with a wireless station.

25 Claims, 3 Drawing Sheets

WIRELESS-BASED POSITIONING WITHOUT ASSOCIATION

CROSS-REFERENCE TO RELATED APPLICATION

The present application claims priority to U.S. Provisional Patent Application No. 61/482,054, filed on May 3, 2011; which is hereby incorporated herein by reference.

BACKGROUND

As mobile devices proliferate, the demand for services tailored to device location also increases. Location-based services depend on positioning systems to determine device location. Satellite-based position systems, such as the global positioning system (GPS), GLONASS, and Galileo can provide high accuracy, but require a clear line of sight between the satellites and the mobile device to provide a position determination. Consequently, satellite-positioning systems are largely ineffective for indoor positioning. Satellite positioning also requires specialized receivers that may increase the cost of the mobile device.

As an alternative or an augmentation to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN. WLAN-based positioning systems determine mobile device position based on the established positions of WLAN access points visible to the device and the strength of signals exchanged between the mobile device and the access points.

SUMMARY

A wireless location assist device (WLAD) may transmit beacons and/or respond to probe requests but not otherwise permit wireless stations to associate with the device or access a wireless local area network. The device is thus a "pseudo access point."

In some embodiments, a wireless location assist device (WLAD) comprises control logic and a wireless radio coupled to the control logic. The control logic causes the radio to perform at least one of wireless local area network (WLAN) beacon transmission and WLAN probe request receipt and response. The control logic never permits the WLAD to associate with a wireless station.

Other embodiments are directed to a WLAD that comprises a non-AC power source, control logic operable from the non-AC power source, and a wireless radio coupled to the control logic and also operable from the non-AC power source. The control logic causes the radio to transmit wireless local area network (WLAN) beacons across a wireless medium without sensing the wireless medium before transmitting each beacon. Further, the control logic initiates a sleep mode after transmitting each beacon, and never permits the WLAD to associate with wireless stations.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
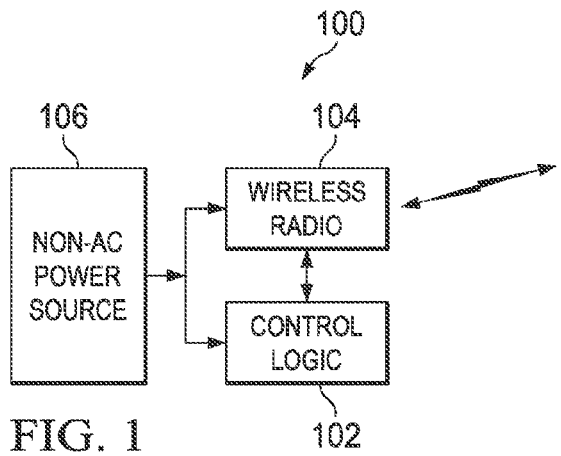
FIG. 1 illustrates a wireless access device (WLAD) in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical or wireless connection. Thus, if a first device couples to a second device, that connection may be through a direct electrical connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a traditional wireless local area network (WLAN), one or more access points (APs) are positioned at various locations. Each AP has an interface to a wired network and permits one or more wireless stations to associate with that AP to thereby permit the wireless stations to access the wired network. Such APs, which are at a fixed known location, also can be used for positioning purposes as noted above. However, APs may not be provided with sufficient density in a building (e.g., a store) to provide adequate location-based services. Some buildings in which location-based services are desired in fact may not even have any APs.

In accordance with various embodiments of the invention, a wireless location assist device (WLAD) is described. The WLAD described herein may transmit WLAN beacons and/or respond to probe requests from nearby wireless stations like a conventional AP, but the preferred embodiment of the WLAD does not have an interface to a wired network, does not permit associations with wireless stations, nor respond to authentication requests from wireless stations. The WLAD may be battery-operated and thus various power saving techniques are described. The beacons or probe requests and probe responses may comply with any of the various IEEE 802.11 standards.

Any of various techniques can be employed by a wireless station to estimate its position based on signals received from the WLAD. For example, once a WLAD is positioned, its location is entered into a database and mapped to the device's Media Access Control (MAC) address. The database thus may contain MAC addresses mapped to locations of all of the WLADs in an area. The wireless station may receive beacons from the various WLADs and, based generally on relative signal strength, ascertain the wireless station's location relative to the nearby WLADs, and through use of the aforementioned database, the wireless station's location in general. Other techniques may be employed as well for ascertaining position by the wireless stations based on wireless signals from the WLADs. Although the WLAD is not a conventional AP, conventional wireless stations that can associate with conventional APs are able to receive beacons from and/or send probe requests to the WLAD and thus ascertain their location without modification.

FIG. 1 illustrates an implementation of a WLAD 100. The WLAD 100 shown includes control logic 102 coupled to a wireless radio 104. The power source for the WLAD may be AC power in some embodiments, but in other embodiments (such as that shown in FIG. 1), the power source is a non-AC power source 106. An example of a non-AC power source 106 includes a battery, solar cell, etc. The wireless radio 104 is capable of sending and/or receiving wireless communications in the frequency band associated with standard WLAN such as the IEEE 802.11 family of standards. Transmissions in the 2.4 GHz and 5 GHz bands are possible.

The control logic 102 controls the operation of the WLAD 100 as described herein. The control logic 102 may comprise a processor or a discrete circuit, and may include memory.

The WLAD 100 preferably is a portable device that can easily be placed on a surface such as a shelf in the area in which wireless stations are expected to be used. Multiple such WLADs 100 can be, and preferably are, placed in a given area in whatever density is desired. For example, the WLADs 100 may be placed every 2 feet down an aisle in a store. The spacing (density) of the devices is a function of whatever spatial resolution is desired. The operation of the WLAD 100 and the control logic 102 is explained below.

Figure 2:
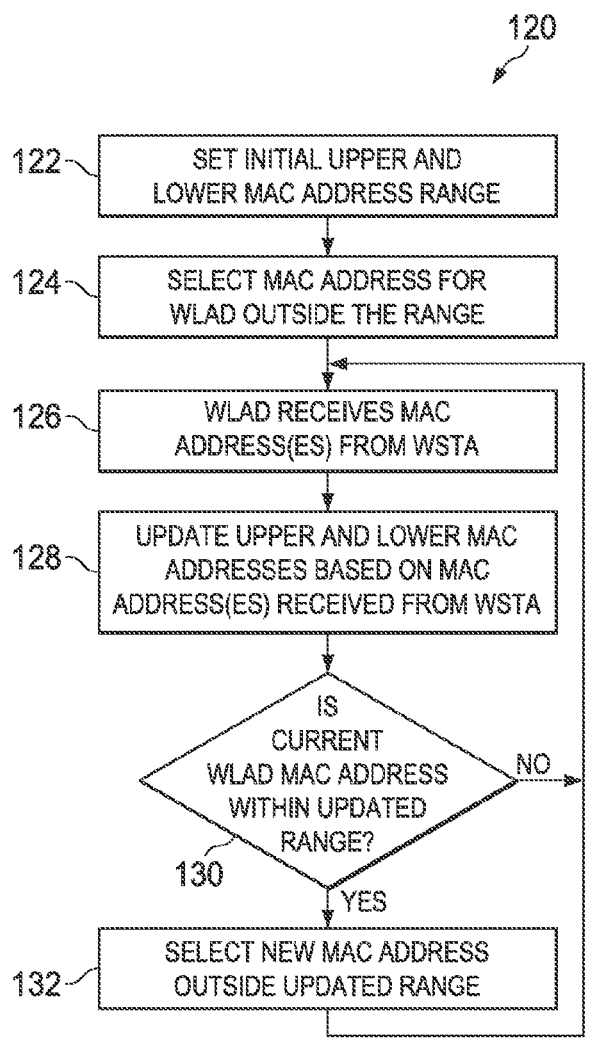
FIG. 2 illustrates a method of providing a Medium Access Control (MAC) address to the WLAD in accordance with various embodiments.

The WLAD 100 operates with a MAC address. The MAC address may be provided to the WLAD 100 in accordance with any of various embodiments. FIG. 2, for example, illustrates one such method 120. Method 120 may be performed by the control logic 102 of the WLAD. The various operations may be performed in the order shown or in a different order, and some operations may be performed in parallel. At 122, the control logic 102 preferably sets an initial upper MAC address and an initial lower MAC address. The upper and lower MAC addresses define a range between the addresses. The control logic 102 preferably does not select a MAC address for its operation that is within the range defined by the lower and upper MAC addresses. The initial upper and lower addresses may be set at initial power up of the WLAD and may be preprogrammed into memory in the control logic 102.

At 124, the control logic 102 selects a MAC address that is outside the MAC address range previously set. Selection of a MAC address may by a random choice or selected in another manner. The selected MAC address is used for operation of the WLAD until replaced as explained below.

At 126, the WLAD 100 receives, via the wireless radio 104, one or more MAC addresses from a nearby wireless station (WSTA). In one embodiment, WSTA MAC addresses are obtained from the probe request frames sent by the WSTAs. In some implementations, the WLAD may read the header field only of any WLAN frame and obtain the MAC address contained therein. Further, one WLAD may respond to a probe request of another WLAD while including the MAC address(es). At 128, the control logic 102 updates the upper and/or lower MAC addresses based on the MAC address(es) received from the WSTA. For example, if the highest numerated MAC address received from the WSTA is higher than the upper MAC address, then the control logic 102 updates (e.g., replaces) the upper MAC address with the higher MAC address received from the WSTA. Similarly, if the lowest numerated MAC address received from the WSTA is lower than the upper MAC address, then the control logic 102 updates (e.g., replaces) the lower MAC address with the lower MAC address received from the WSTA. As a result, the newly set upper and lower MAC addresses represent the minimum and maximum MAC addresses of APs to which the WSTAs have been associated. If the WLAD has the ability to send a signal to the AP location database that its MAC address has changed and also to provide the old and new values, that would allow the database maintenance to be seemless when such changes occur. After a certain amount of time, the MAC addresses used can be frozen so that they do not further change regardless of what other MAC addresses are observed in the network.

At 130, the control logic 102 compares the WLAD's MAC address currently in use for wireless communications with the lower and upper MAC addresses. If the currently used MAC address is outside the range defined by the lower and upper MAC address, then the control logic 102 does not change the currently used MAC address and control loops back to 126 in which the WLAD may receive another report of MAC addresses from a WSTA and the process repeats. If, however, the currently used MAC address is within the range defined by the lower and upper MAC addresses, then the control logic 102 at 132 selects a new MAC address that is outside the range. The newly selected MAC address may be randomly computed or selected in another suitable manner.

In another embodiment, the MAC address used by the WLAD 100 may be preloaded into the WLAD during the manufacturing of the device, or by a person setting up the WLAD for subsequent use. The MAC address may be selected by, or assigned to, the manufacturer to be a MAC address not otherwise used by conventional APs. Alternatively, the MAC address may be an address that is used by an AP, but in a different geographical area, such as in a different country.

In some embodiments, the WLAD 100 transmits beacons and responds to probe requests, and never permits any WSTAs to associate with the WLAD. An association is the process whereby a conventional AP registers the WSTA so that frames are sent to the correct address. Sometimes, an association is preceded by authentication. In some embodiments of the WLAD, the control logic 102 does not permit WSTAs to be authenticated. Further, in some implementations, the WLAD does not respond to any wireless signals of any kind other than probe requests and does not transmit wireless signals of any kind other than beacons and/or probe request responses.

A beacon (also called a beacon frame) is a type of management frame and provides the "heartbeat" of a WLAN for APs that transmit them. A beacon may include the MAC address of the source device transmitting the beacon (AP or, in this case, the WLAD). The destination address is set to a broadcast address (e.g., all ones). The body of the beacon may carry various pieces of information including any or all of the following:

> Beacon Interval—the time period between beacons
> Timestamp—a time value indicative of when the beacon was transmitted
> Service Set Identifier (SSID)—identify of a particular WLAN
> Supported Rates—data rate supported by the associated WLAN
> Parameter Sets—information about specific signaling methods (e.g., frequency hopping spread spectrum, direct sequence spread spectrum, etc.)
> Capability Information—requirements of WSTAs that wish to associate with the AP and use that AP's WLAN (e.g., wired equivalent privacy (WEP))
> Traffic Indication Map (TIM)—identifies which WSTAs using power saving modes of operation have data frames awaiting them in a buffer in the AP transmitting the beacon While a conventional AP may include meaningful information in each of the preceding portions of the beacon, in accordance with a preferred embodiment of the invention, the WLAD may not incorporate useful information in all of the preceding fields. For example, the WLAD 100 may provide a legitimate beacon interval and timestamp, but bogus values for the supported rate, parameter set, capability information, and TIM fields. Because, for example, the WLAD 100 may not enable the WSTA to access a WLAN, the WLAD does not have an SSID of an actual WLAN to which the WSTA can access.

A probe request is a frame that is transmitted by a WSTA to an AP or, in this case, the WLAD. In a probe request, a WSTA requests information from either a specific access point, specified by SSID, or all access points in the area, specified with the broadcast SSID. The requested information may be the supported data rates, so that the WSTA knows what data rate to use with a particular AP. Probe requests permit WSTAs to actively scan the wireless medium for APs. A probe request may be directed to a specific AP and include as the destination MAC address the MAC address of a particular AP, or a probe request may be a broadcast request using the broadcast SSID (e.g., all ones).

An AP/WLAD receiving a probe request responds with the requested information (e.g., supported data rates) by way of a probe request response. The information provided in a response to a probe request may be similar to the information provided in a beacon. The probe response may include the SSID of the WLAD. The WLAD may respond with bogus information.

Because the WLAD 100 in this embodiment only ever needs to process packets at the lowest data rate, the RF chain in its wireless radio 104 can be implemented for a low power consumption. The RF chain can operate at lower transmit/receive power thresholds or can implement a subset of data rates to be supported for WSTAs (e.g., only the rates at which beacon, probe request, and probe responses are transmitted). Once having received beacons or responses to probe requests, the WSTA is able to determine its location as described above.

In another embodiment, the WLAD receives and responds to probe requests, but does not transmit beacons. In this embodiment, the probe request response preferably includes the SSID of the WLAD 100 and may include other information as well. In this embodiment, the receiver in the wireless radio 104 is always on so that it is always ready to receive and respond to probe requests. As with the preceding embodiment, the RF chain in the wireless radio 104 can be implemented for low power consumption because it only need receive low data rate probe requests.

In yet another embodiment, the WLAD 100 transmits beacons but does not respond to probe requests. Beacons may be transmitted at regular intervals. The WLAD still may have a receiver in its wireless radio for the purpose of sensing the wireless medium before transmitting a beacon. Sensing the wireless medium helps to ensure there is not already traffic on the wireless medium with which a beacon undesirably would "collide."

Because the WLAD in this embodiment does not respond to probe requests, the control logic 102 can cause the WLAD to transition to a low power mode of operation such as a sleep mode in between beacon transmissions. Transitioning to a sleep mode helps save power, which is particularly desirable if the power source 106 is a battery.

Figure 3:
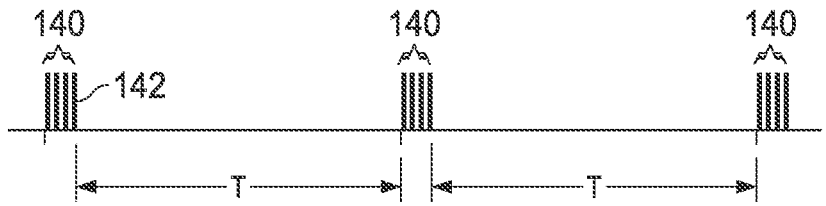
FIG. 3 illustrates an inter-packet interval for beacons in accordance with various embodiments.

Various implementations of the "transmit beacon only" embodiment are possible. For example, in one variation, the control logic 102 causes the radio 106 to transmit packets of beacons, each packet comprising a predetermined number (one or more) of beacons separated by a predetermined time interval. FIG. 3 illustrates one example in which packets 140 of beacons 142 are transmitted at an inter-packet interval designated as T. The time interval T is selected or preconfigured into the WLAD 100 to approximately match the scanning frequency of the WSTAs.

In another variation, the WLAD 100 adjusts the inter-packet interval for the beacons (T) based on its power objectives (e.g., it can reduce its power consumption by increasing beacon time intervals). The WSTAs scan by transmitting probe requests at a longer interval ($T_L$) at least once. Then, each WSTA will know (from receiving two consecutive beacons) when the beacon inter-packet interval will change to shorter intervals so that the WSTA can scan the wireless channels for at a shorter interval ($T_S$). Thus, the WLAD 100 transmits $N_S$ beacon packets separated by a shorter interval $T_S$, and then transmits $N_L$ beacon packets separated by a longer time interval $T_L$.

In accordance with some embodiments, the WLAD 100 transitions to a lower power mode of operation to conserve power (e.g., battery power). One example was discussed above in which the control logic 102 causes a transition to the lower power mode after each transmitted beacon, or packet of beacons.

Figure 4:
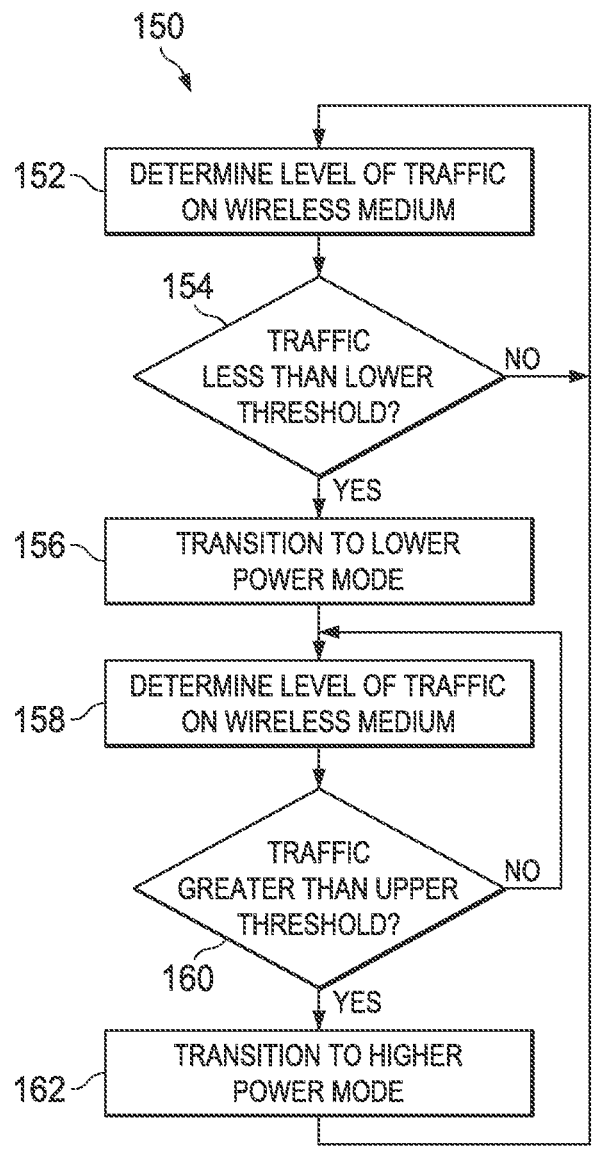
FIG. 4 illustrates a method of adjusting the power mode of the WLAD based on the level of traffic on the wireless medium in accordance with various embodiments.

Alternatively, the transition to a lower power mode may be triggered by detection of a low level of conventional WLAN traffic (via conventional APs) on the wireless medium. The traffic level can be determined by the WLAD 100 by counting the number of packets received during a time interval. FIG. 4 illustrates one such method 150. The control logic 102 of the WLAD preferably performs the method. The operations may be performed in the order shown or in a different order, and may be performed serial or at least some operations may be performed in parallel. Initially, the WLAD is operating in a higher power mode. At 152, the method comprises the control logic 102 determines the level of traffic on the wireless medium. At 154, the control logic preferably determines whether the traffic level is less than a lower traffic level threshold. The lower traffic level threshold represents a level, below which, for example, it is determined that very few WSTAs are in the vicinity of the WLAD 100. A low traffic level condition may indicate that the building (e.g., store) in which the WLAD is located is closed for the night. If that is the case, then there is little or no benefit in continuing to transmit beacons in those embodiments in which beacons in fact are permitted.

If the traffic level is less than the lower traffic level threshold, then the control logic 102 transitions the WLAD to a lower power mode (156). At 158, the control logic again determines the level of traffic on the wireless medium. At 160, the control logic determines whether the level of traffic on the wireless medium is greater than an upper threshold. The upper traffic level threshold represents a level, above which it is determined that, for example, the building (e.g., store) is likely open for business. The use of an upper threshold advantageously also imparts hysteresis into the process. If the level of traffic on the wireless medium is below the upper threshold, control loops back to 158; otherwise, the control logic 102 transitions the WLAD to the higher power mode at 162 and control loops back to 152 to determine when the power mode should again be lowered.

Figure 5:
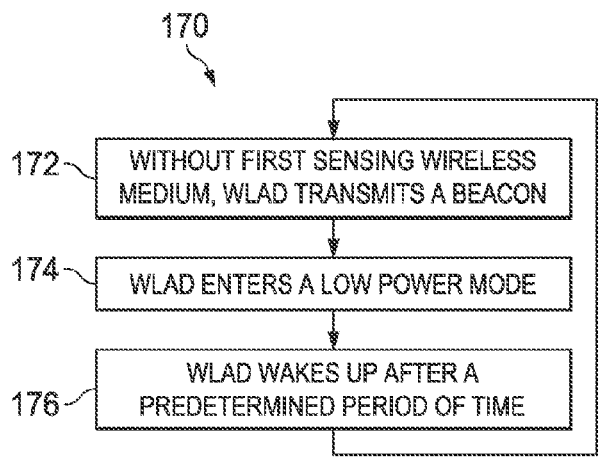
FIG. 5 illustrates a method of adjusting the power mode of the WLAD based on a predetermined time period in accordance with various embodiments.

FIG. 5 illustrates a method 170 in which the WLAD 100 enters a low power mode of operation. The method may be performed by the control logic 102 and in the order shown or in a different order. The operations may be performed serially or in parallel. In this embodiment, as may be the case in other embodiments, beacons are transmitted by the wireless radio 104 on a channel that is not used for normal WLAN traffic. Because there is no or little WLAN traffic to avoid disturbing, the WLAD 100 need not sense the wireless medium prior to transmitting each beacon. Because the beacon itself is relatively short and may only be transmitted tens of times per second, collisions between beacons from different WLADs 100 are unlikely. Further, the WLADs may be spatially separated enough so as to further reduce the likelihood of beacon collisions.

At 172, the method comprises transmitting a beacon, or packet of beacons, without first sensing the wireless medium. Lack of wireless medium sensing may result from a WLAD that does not have a receiver in its radio (i.e., the radio is a transmitter only). Alternatively, the WLAD may have a receiver but does not use the receiver to sense the medium. At 174, the WLAD immediately after transmitting the beacon, enters a low power mode, and at 176, the control logic 102 causes the WLAD to transition back to the higher power mode after a predetermined period of time has elapsed following the previously transmitted beacon. Control then loops back to 172.

In other embodiments, the WLAD may include a photo-sensor to enable the control logic 102 to transition the device to the low power mode if the detected ambient light falls below a threshold. The low light condition may be indicative of evening in which the building in which the WLAD is located is likely closed and thus location assist determination for WSTAs is not needed. In yet other embodiments, the control logic 102 includes, or has access to, a clock and causes a transition to the lower power mode based on time of day and/or day of the week. For example, the WLAD can be programmed to transition to the lower power mode at close of business and back to the higher power mode the next morning. If the building is closed on Sundays, then the lower control logic may force the device to the lower power mode all day Sunday.

Figure 6:
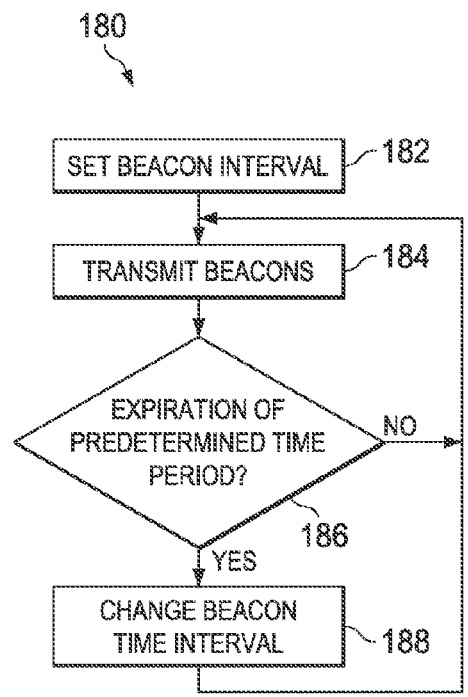
FIG. 6 illustrates a method of changing the beacon time period in accordance with various embodiments.

In some embodiments, the WLAD 100 is configured to vary the beacon inter-packet time interval (T, FIG. 3) to prevent the case where consecutive beacons collide over a long duration of time. The variation of the time period may be random or a predetermined amount. FIG. 6 illustrates one such method 180. The method of FIG. 6 may be performed by the control logic 102 and in the order shown or in a different order. The operations may be performed serially or in parallel. At 182, the method comprises setting the beacon inter-packet time interval (T). At 184, beacons are transmitted in accordance with the previously set beacon interval. At 186, the control logic determines whether a predetermined period of time has expired. An example of a suitable time period is one minute, although the predetermined time period can be any desired time period. Once the predetermined time period has expired, at 188 the beacon inter-packet time interval is changed. In some embodiments, the change may occur by the control logic 102 computing a random delay value and adding the computed random delay value to the current beacon interval. The random delay value may be either positive or negative thereby to increase or decrease the current beacon inter-packet interval.

Figure 7:
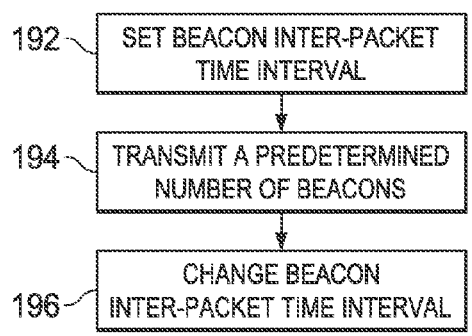
FIG. 7 illustrates another method of changing the beacon time period in accordance with other embodiments.

Method 190 of FIG. 7 is similar to that of method 180 of FIG. 6 but, rather than using a predetermined time period to trigger a change to the beacon interval, the transmission of a predetermined number of beacons, or beacon packets, triggers the change of the beacon interval. The method of FIG. 7 may be performed by the control logic 102 and in the order shown or in a different order. The operations may be performed serially or in parallel. At 192, the method comprises setting the beacon inter-packet time interval. At 194, a predetermined number of beacons (or beacon packets) are transmitted in accordance with the previously set beacon interval. Once the predetermined number of beacons/packets is transmitted, the beacon inter-packet time interval is changed (194). As explained above, the change may occur by the control logic 102 computing a random delay value and adding the computed random delay value to the time interval. The random delay value may be either positive or negative thereby to increase or decrease the current beacon interval.

In embodiments in which the WLAD transmits beacons, the beacons may be transmitted in a single channel or in multiple channels in a given frequency band (e.g., channels 1, 6, and 11).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless location assist device (WLAD), comprising:
    control logic; and
    a wireless radio coupled to the control logic;
    wherein the control logic causes the radio to perform at least one of wireless local area network (WLAN) beacon transmission and WLAN probe request receipt and response; and
    wherein the control logic never permits the WLAD to respond to an authentication request from a wireless station in order to not associate with a wireless station.

2. The WLAD of claim 1 wherein the control logic determines that an association request from a wireless station is not a probe request and ignores the request.

3. The WLAD of claim 1 wherein the control logic selects a medium access control (MAC) address to use based on MAC addresses received from a wireless station or another WLAD.

4. The WLAD of claim 1 further comprising a non-AC power source and wherein the control logic and wireless radio operate exclusively from the non-AC power source.

5. The WLAD of claim 1 wherein the WLAD does not have an interface to a wired network.

6. The WLAD of claim 1 wherein the control logic causes the radio to perform both beacon transmission and probe request receive and response.

7. The WLAD of claim 1 wherein the control logic causes the radio to receive and respond to probe requests but not transmit beacons.

8. The WLAD of claim 7 wherein the control logic obtains the MAC addresses from the received probe responses.

9. The WLAD of claim 7 wherein the control logic modifies its beacon time interval to reduce power consumption.

10. The WLAD of claim 1 wherein the control logic causes the radio to transmit beacons but not respond to probe requests.

11. The WLAD of claim 10 wherein the control logic causes the WLAD to enter a sleep mode after every beacon.

12. The WLAD of claim 10 wherein the control logic causes the radio to transmit packets of beacons, each packet comprising a predetermined number of beacons separated by a predetermined time interval.

13. The WLAD of claim 1 wherein the control logic initiates a sleep mode based on the control logic detecting a rate of wireless traffic below a threshold.

14. The WLAD of claim 1 wherein the control logic initiates a sleep mode based on the control logic detecting a rate of probe requests below a threshold.

15. The WLAD of claim 1 wherein the control logic initiates a sleep mode based on the control logic on time of day.

16. The WLAD of claim 1 further comprising a photo sensor, and wherein the control logic initiates a sleep mode based on a signal from the photo sensor.

17. The WLAD of claim 1 wherein the control logic causes the radio to transmit packets of beacons and the radio does not sense any wireless channel before transmitting the beacons.

18. The WLAD of claim 1 wherein the control logic causes the radio to transmit beacons and introduces a randomized time delay after transmitting at least one beacon.

19. A wireless location assist device (WLAD), comprising:
a non-AC power source;
control logic operable from the non-AC power source;
a wireless radio coupled to the control logic and operable from the non-AC power source;
wherein the control logic causes the radio to transmit wireless local area network (WLAN) beacons across a wireless medium without sensing the wireless medium before transmitting each beacon;
wherein the control logic initiates a sleep mode after transmitting each beacon; and
wherein the control logic never responds to an authentication request from a wireless station so as to not permit the WLAD to associate with wireless stations.

20. The WLAD of claim 19 wherein the wireless radio does not have a wireless receiver.

21. The wireless WLAD of claim 19 wherein the control logic causes the radio to transmit WLAN beacons on a plurality of channels in a given frequency band.

22. The WLAD of claim 19 wherein the control logic determines that an association request from a wireless station is not a probe request and ignores the request.

23. The WLAD of claim 19 wherein the control logic causes the radio to perform both beacon transmission and probe request receive and response.

24. The WLAD of claim 19 wherein the control logic causes the radio to receive and respond to probe requests, but not transmit beacons.

25. The WLAD of claim 19 wherein the control logic causes the radio to transmit beacons but not respond to probe requests.

* * * * *